United States Patent [19]

Zondek

[11] 4,116,652

[45] Sep. 26, 1978

[54] PROCESS FOR THE FREEZE CONCENTRATION OF SOLUTIONS

[76] Inventor: Klaus Zondek, Casilla 10012, Santiago, Chile

[21] Appl. No.: 686,808

[22] Filed: May 17, 1976

Related U.S. Application Data

[63] Continuation-in-part of Ser. No. 486,369, Jul. 8, 1974, abandoned, Ser. No. 309,689, Nov. 27, 1972, abandoned, and Ser. No. 170,249, Aug. 9, 1971, abandoned.

[51] Int. Cl.$^2$ ............................................. B01D 9/04
[52] U.S. Cl. ......................................... 62/534; 62/541
[58] Field of Search ................ 62/532, 533, 534, 535, 62/537, 540, 541, 542; 23/273 F, 273 R; 210/71, 72

[56] References Cited

U.S. PATENT DOCUMENTS

| | | | |
|---|---|---|---|
| 3,167,401 | 1/1965 | Herman | 62/532 |
| 3,182,463 | 5/1965 | Stearns | 62/534 |
| 3,250,081 | 5/1966 | Othmer | 62/532 |

FOREIGN PATENT DOCUMENTS

| | | |
|---|---|---|
| 2,235,764 | 2/1974 | Fed. Rep. of Germany. |
| 2,158,754 | 6/1973 | Fed. Rep. of Germany. |
| 2,158,755 | 6/1973 | Fed. Rep. of Germany. |

*Primary Examiner*—Frank Sever
*Attorney, Agent, or Firm*—Robert E. Burns; Emmanuel J. Lobato; Bruce L. Adams

[57] ABSTRACT

The invention is directed to freeze concentration of liquid mixtures including solutions by the direct contacting in at least two stages, of the mixture with a miscible refrigerant. After the contacting of the refrigerant with the liquid mixture, there is provided a first stage crop of substantially pure crystals of a mixture component which is separated from the mother liquor. The mother liquor is then further cooled and crystallized in further stages. Any crystals from said further stages are returned to the first or preceeding stage. This concentrates the second stage and further stage mother liquors.

This process is applicable to the freeze concentration of juices, coffee or tea extracts and beers. It also may be utilized for the purification of brackish water. The purity of the first stage crystals is assured by controlled crystal growth. The successive stages provide for a complete concentration of the residual matter in the mother liquor. When the residual matter in the mother liquor is the desired product, it is recovered in very concentrated form. Should the crystals from the first stage be the desired product, their high degree of purity is advantageous.

9 Claims, 2 Drawing Figures

PROCESS FOR THE FREEZE CONCENTRATION OF SOLUTIONS

RELATED APPLICATIONS

This application is a continuation-in-part of my U.S. patent applications Ser. No. 170,249, filed Aug. 9, 1971 entitled Process for Separating Fatty Acids and Dewaxing Oil and Ser. No. 309,689 and Ser. No. 486,369 filed Nov. 27, 1972 and July 8, 1974 respectively, entitled Process for the Separation of Dissolved Materials from their Solutions. The above applications are now abandoned.

FIELD OF THE INVENTION

This invention relates to the freeze concentration and separation of materials in and from their solutions and solvents in a minimum of two steps or stages. More particularly this invention relates to such processes and apparatus whereby the solvent is frozen from the solution by the cooling action resulting from the evaporation of a high-vapor pressure, low-boiling liquid coolant or refrigerant.

BACKGROUND OF THE INVENTION

In prior processes for obtaining concentrates by freeze concentration, up to 50% of the contained water could be easily eliminated. It has been commercially difficult to eliminate the additional water.

The exceedingly high concentration of sugar and other substances always produced increasingly smaller crystals (microcrystals) which are difficult to separate in a satisfactory manner. Where it was economic to separate such micro-crystals, they carried down, by absorption, much of the raw initial feedstock. The resultant losses made it uneconomical to concentrate the product beyond the 50% concentration.

The viscosity of the concentrate also continuously increased until the mother liquors could no longer be economically and/or conveniently pumped.

To avoid either or both of these problems, most installations operate in two separate unit operations i.e. they concentrate the initial material by a freeze-crystallization process and then they subject this concentrate to other concentration means i.e. high vacuum evaporation by the thin wall method, spray drying, cryo-drying and even high-surface area diffusion processes. These subsequent unit operations utilize much energy, require highly sophisticated equipment and, unless the final products are extremely valuable (drugs), are generally uneconomical.

In most of these secondary-concentration procedures, the feedstocks are heated to some extent in order to evaporate the residual water. This heating step results in some loss of aroma and the vitamins are often destroyed by oxidation. In fact the oxidation of other labile components, as in fruit juices, cannot be avoided.

As a result, several varied systems have been employed for the final concentration operation which aim at the recovery of the lost aroma. In general these have not been completely effective.

It has been an object of this invention to find a process which is not subject to the above mentioned disadvantages.

Many crystallization methods are directed at removing the more readily crystallizable fractions by cooling and thus concentrating the other components and/or even purifying them through the elimination of the crystallizable diluents or impurities. Many of the known methods are based upon an indirect cooling of the liquid in suitable containers. After the desired low temperature has been obtained and the crystallization of the more readily crystallizable components is achieved, the next step consists in the separation of the crystals from the mother liquor by standard means such as filter presses, centrifuges, screw-expellers and other suitable liquid-solid separating apparatus.

In these known methods, the crystals are separated from the liquid in scraper-coolers, with indirect contact between the liquid and the refrigerant or coolant via the cooled surfaces. The crystals form on the wall that is at a low temperature and hence the crystal adheres thereto and must be scraped off. These methods have three primary disadvantages:

(a) the crystals are comminuted during removal;

(b) impurities arise as a result of the mechanical wear of the scraper and the scraped surfaces;

(c) interruptions in the process often occur due to clogging of the separation apparatus by the comminuted crystals.

New processes based upon direct cooling, where the refrigerant is contacted with the feedstock in a co-current or counter-current manner, have not as yet been economically practical. These newer processes generally require that the specific gravities of the refrigerant, the feedstock and the crystals must differ in order to be able to achieve a suitable separation in the subsequent separations steps. Furthermore, they require that the refrigerating fluid be imiscible with the crystallizable substances. To achieve good separation of the crystals, substantial equipment investment is required and such operations must be carried out with great care in order to produce crystals of proper size to avoid difficulties in separation.

THE INVENTION

The process of this invention is characterized by the fact that particularly high concentrations may be achieved with low energy consumption and a high degree of purity and crystal selectivity is achieved.

According to this invention, it is possible to obtain hitherto unachieved high concentrations of such feedstock materials as fruit juice by the use of freeze concentration alone, thereby preventing loss of aroma, loss of taste or destruction of vitamins. As a result of the present invention, it has been possible to obtain fruit juice concentrates of a quality which hitherto could not and had not been industrially attained.

The present invention is based upon the process for concentrating feedstock mixtures which includes the steps of introducing such mixtures of components including crystallizable solvents and/or crystallizable or amorphous solutes into a first contact column or vessel. The feedstock mixtures are then cooled to a first stage temperature below the freezing point of a first crystallizable fraction or component. The cooling is accomplished by injecting and expanding into the feedstock a low-boiling, high-vapor pressure, liquid refrigerant that is miscible with said mixture. The cooling to the first stage temperature is adjusted by regulating the pressure in the vessel, the amount and rate of refrigerant being injected into the vessel and the feed rate of the feedstock mixture thereto. Such adjustment and regulation provides a first crystallizable fraction or component which crystallizes in a substantially pure crystalline form, principally due to the low solute concentration existing in the first stage.

This first crystallizable fraction or component in the form of crystals is separated from the mother liquor. This mother liquor comprises the still liquid components of the mixture and any unvaporized quantities of liquid refrigerant. The amount of unvaporized refrigerant is controlled by the regulated temperature and pressure in the first contact vessel.

The separated crystals are removed from the mother liquor and washed. The separated mother liquor is then transferred into at least one further contact vessel. In each of said further contact vessels, the mother liquor is cooled to temperatures, each successively below the first temperature in the first contact vessel. These further cooling stages of the mother liquor are accomplished by injecting and expanding additional liquid refrigerant into said further contact vessels. As a result of the said further cooling of the transferred mother liquor in said further successive stages, successive slurries of crystals of the remaining crystallizable fractions or components occur and successively greater amounts of other crystallizable components of the feedstock form in mixture with further concentrated mother liquors which may contain successively additional unvaporized liquid amounts of refrigerant. The additional liquid refrigerant assists in maintaining the fluidity of the mother liquor.

These successive slurries of crystals and other crystallizable components are each separated from the successively more concentrated mother liquors. Any adhered mother liquor may be washed from these successively formed crystals. The successively separated crystals are melted and are recycled either to the preceding contact vessel or to the first contact vessel.

The concentrated mother liquor in the last of said successive contact vessels is stripped of all unvaporized refrigerant in order to recover and recycle same. The stripped final mother liquor is recovered as the final concentrate or product. The crystals separated from the first contact stage which are in substantially pure form, are also recoverable.

It is possible to recycle a fraction of the successive mother liquor obtained after the separation the crystals to the same stage contact vessel in order to adjust the crystal concentration of the slurry within said vessel to permit proper crystal growth with minimal adsorbed impurities.

In accordance with various other aspects of this invention, it is also possible to melt the separated crystals from each successive stage in heat exchange relationship between the crystals and the recycled recompressed refrigerant to thus condense the compressed refrigerant to the liquid state.

While it is preferred generally to use a liquid refrigerant that is completely miscible with the feedstock mixtures and the mother liquors, said refrigerant may also be partially or completely insoluble in said dissolved mixtures. An advantage of such miscibility and solubility is that successively increasing amounts of liquid refrigerant may be included in the successive mother liquors in order to maintain these successive mother liquors and their components in a desired stage of solubility, fluidity, viscosity and to control the crystallization of many of the crystallizable components at the temperatures within said contact vessels.

A further aspect of this invention wherein the liquid refrigerant is soluble in the feedstock mixtures is that the solutes remain soluble in the refrigerant and it is thus possible to achieve a replacement of the crystallized solvent component by the liquid refrigerant. The liquid refrigerant is subsequently stripped to yield the concentrated solutes.

Generally, the concentrated feedstocks to which the invention is directed are the liquid solutions including fruit juices, fermented fruit juices, beers, milk and brackish waters having a major crystallizable solvent component. These generally are concentrated to yield concentrates of comestible or imbibable materials. However, the process is not to be limited thereto as it can also serve to recover and concentrate other valuable materials from their solutions or admixtures by freeze concentration by removal of crystallizable components of said solutions.

Generally, in the practice of this invention, the refrigerant-cooling agent is selected from the group of low boiling high-vapor pressure refrigerants having a high caloric equivalent of heat of vaporization selected from the group consisting of saturated and unsaturated aliphatic hydrocarbons having 4 or less carbon atoms and halogenated derivatives thereof, carbon dioxide, ammonia and mixtures thereof which are non-degrading with respect to said mixtures being concentrated.

The process of this invention may also be utilized for selectively separating crystals of different melting point components. In such selective separation, the components are not conveyed from a later contacting stage to an earlier contacting stage but are kept in separate circuits, including individual later contacting stages and thus the desired components are completely crystallizable as a result of a continuous re-crystallization, thereby obtaining the products of high purity.

In addition, according to another aspect of this invention, an apparatus comprising a plurality of cooling contact-column or vessel-contacting zone means is provided including a first contact column means and successive contact column means, each having located at the bottom thereof coolant introduction valve means designed to contact the feedstock mixture or mother liquor with a vaporizing and a diabatically expanding refrigerant and providing a pressure drop between said column means on the inside of said valve means and the source of refrigerant on the outside of said valve means whereby said refrigerant, by vaporization and adiabatic expansion, cools said liquid mixture; and said contact column means being connected to separator means for continuously removing crystals formed in said contact column from the still liquid mixture.

The process of the invention offers certain useful advantages. When the refrigerant is miscible with the solution being concentrated, and the solutes are soluble in the refrigerant, the material may be concentrated until all of the solutes are completely extracted from the solvents or diluent. During the latter stages of concentration, the refrigerant itself acts as a solvent and may then, at the final stage, be stripped from the solute. Further, if the coolant is immiscible with the material being concentrated, it serves as a vehicle and diluent for the slurry to maintain it in pumbable state until the very last stages to prevent the slurry and mother liquors from becoming too viscous.

The process of the present invention, further offers the advantage of permitting a high degree of concentration but with concurrent maintenance of the vitamin, aroma and taste components. The process, as it is devoid of any stages at which the material is subjected to elevated temperatures and/or external oxidants such as oxygen in the air, thus avoids these common drawbacks of the prior art. Further, even if some of the components of the aroma of the feedstock should have high vapor pressures, as the gases within the system are continuously recycled, the aroma remains within such gaseous components and is constantly reinjected into the concentrate until the components completely saturate the gases and reach a concentration and form wherein they redissolve in the concentrate.

Because of the simplicity of the various processing stages, the invention provides for complete control of both the rate of crystallization and the size of the final crystals. The temperature and the concentration may be completely regulated by the rate of feed of raw material, rate of removal of the final product, rate of introduction of the refrigerant, pressure drop during the adiabatic expansion of the refrigerant, addition or changes in both the nature of the refrigerant and/or other solvents introduced into the system. Furthermore, the refrigerant coolant is completely recovered as the process operates under a closed cycle except for the introduction of the raw material and removal of the concentrate and its by-product.

As each stage of the process is subjected to careful isolation and control, the energy requirements of the process are low. The melting of the various crystals, may be carried out so that the latent heat required for such melting operations, is utilized to cool and condense the refrigerant, precool feedstocks or warm the removed products.

Further as the process operates in a closed system, it is suitable for the treatment of any nature of product regardless of how heat or oxidation labile it may be. The product is never exposed to advserse elevated temperatures or extraneous oxidation by air.

The crystals obtained and removed from the first stage are very pure and are of a convenient size for separation steps including a washing step. Thus the impurity of these crystals is greater than would normally be available by the prior art processes because they are formed in a solution of low concentration. Further, as in the case of treatment of brackish water, and fruit juice concentrates, ice crystals are removed at the first stage leaving behind a concentrated mother liquor. The salts recovered from certain brackish waters are commercially valuable. The juice concentrates of course are a prime product.

The crystals formed from the mother liquor in the second and successive steps are all recycled to the preceeding including the first step and thus large crystal growth in the first step or stove is enhanced. It is well known that the larger the crystal, the purer is the nature of its components.

Further, the process also permits according to another aspect, selected separation of crystals at two or more temperatures. Thus crystals can be removed from the first stage and also from the second stage or succeeding stages. This procedure can be utilized for the separation of close-melting components such as for the separation of ortho-and para-xylene.

DETAILED DESCRIPTION

Figure 1:
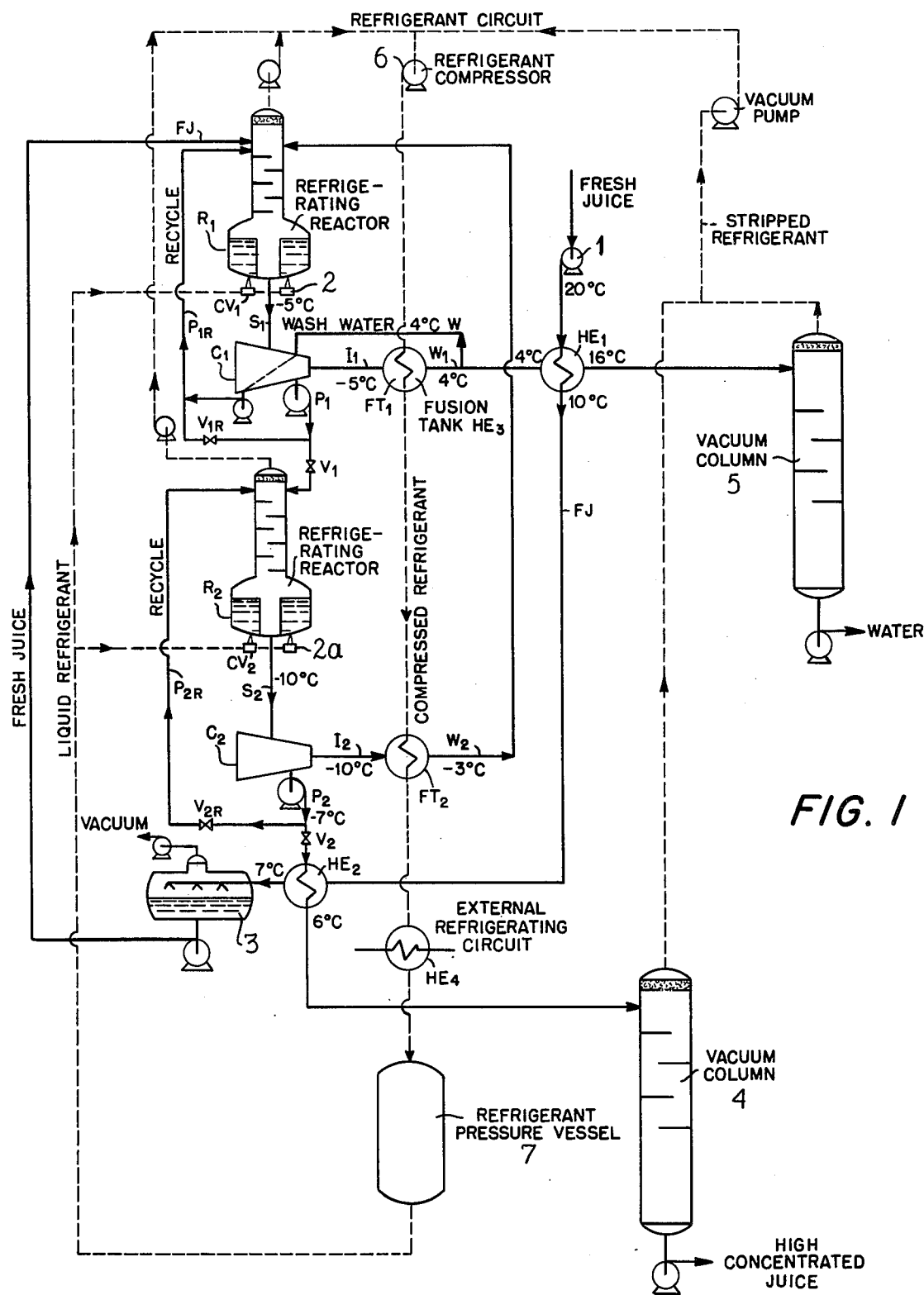

The invention will be more completely described with reference to the drawings in which FIG. 1 describes the process of this invention utilizing only two stages for the concentration of fruit juices and FIG. 2 describes the process utilizing four stages for the concentration.

In principle, considering only the process as described in FIG. 1, the two stage separation, the process operates as follows:

The fresh feed of juice, FJ is pumped into the first contact vessel $R_1$. The contact vessel $R_1$ is connected to crystal separating centrifuge $C_1$. The temperature within contact vessel $R_1$ is continuously reduced by the direct injection of the refrierant therein via valves $CV_1$. As a refrigerant of the lowering of the temperature in vessel $R_1$, a slurry of crystals of the first crystallizable component in a mother liquor are obtained. This slurry S. is continuously fed into centrifuge $C_1$ where the crystals are separated from the mother liquor and from where the mother liquor is recycled to vessel $R_1$.

The temperature in vessel $R_1$ is maintained within the controlled limits set to provide complete crystallization of all crystallizable components, crystallizable down to said controlled temperature. The mother liquor is continuously and constantly returned into vessel $R_1$. As the temperature in vessel $R_1$ is maintained constant at the proper temperature, the crystallizable components are continuously formed and grow into large crystals. These large ice crystals are removed from the slurry by centrifuge $C_1$ where they are washed. They may be melted in heat exchange relationship in fusion tank $FT_1$, a heat exchanger, to cool and partially condense the compressed refrigerant vapors. Some melting heat may also be exchanged from cooling the fresh juice being fed into Juice holding tank 3 which provides the feedstock FJ to vessel $R_1$. The (water) is then removed from the system via vacuum column 5 where adhered refrigerant vapors are stripped. The water is discarded or when the water is desired as in purification of brackish water, the water is utilized in its pure form. First stage vessel $R_1$ which may be a contact column, is preferably maintained at about $-5°$ C during juice concentration, in order to obtain a substantially pure ice crystal.

The mother liquor is continuously recycled into vessel $R_1$ from centrifuge $C_1$ together with any washwater. A portion of the first stage concentrated mother liquor from centrifuge $C_1$ is pumped into the second stage contact vessel $R_2$. This contact vessel $R_2$ operates in a manner similar to that of the first stage contact vessel $R_1$. It is also cooled by the injection of refrigerant, but it is cooled to a lower temperature at which another slurry of a portion of crystals forms in a further concentrated mother liquor. The type and proportion of the crystals depend upon the lower temperature to which vessel $R_2$ has been adjusted. Thus if desired, two different crystallizable components can be selectively removed, one crystallizing at the temperature of vessel $R_1$ via centrifuge $C_1$ and the other crystallizing at temperatures down to the lower temperature of second stage vessel $R_2$ via centrifuge $C_2$.

The crystals from the first stage centrifuge $C_1$ are washed, removed from the system and then melted in heat exchanger relationship as set forth above. These crystals are of high purity from the first crystallizable component. The crystals from the second stage cooling removed from the second centrifuge $C_2$ and, except where specifically desired for selective separation as set forth above, are melted and the melt is reintroduced and recycled into first stage contact vessel $R_1$ thus recovering any incorporated and adherent mother liquor on these crystals.

In the case of fruit juices, this effect is utilized in order to obtain very high concentrates of the fruit juice solids. However, in each case, the further cooling is always performed in the same manner and the crystallizing portion of the slurry of crystals from the second and successive stage vessels $R_2$ which is separated at centrifuge $C_2$ is returned to the first vessel $R_1$ in order thereby to preserve the low level of crystallizable components of the already concentrated mother liquor. It also provides control for the separation in an active manner of the second crystallizable components which are crystallized down to the temperature of the second contact vessel operating temperature.

In the case of fruit juices, crystals separated by the second centrifuge $C_2$ are melted and passed into the first reactor. These second crop crystals are utilized as a coolant for the compressed refrigerant during their melting in order to condense it partially to liquid form. At the same time, any incorporated and adherent fruit juice concentrate mother liquors are not lost.

When the desired separation of crystallizable components has been obtained, a portion of the final liquid concentrate, from centrifuge $C_2$ is degased, stripped of any refrigerant therein and is removed as the finished final concentrate.

The crystals separated by the first stage centrifuge $C_1$ are melted in heat exchange relationship for the cooling and partial condensing of the compressed refrigerant and a portion of this is then used as the wash in centrifuge $C_1$. This wash liquor is then returned to the first contact vessel $R_1$ in order to prevent losses of mother liquor.

The entire cooling system is designed for direct liquid injection of the refrigerant into the contact vessels $R_1$, $R_2$. After expansion, the refrigerant vapors are continuously withdrawn at the top of the vessels, cooled and recondensed as is usual in closed-cycle treatment of refrigerant gases. These gases may be compressed by conventional compressors and the compressed gases are then cooled and liquidified for reuse.

The process of this invention may be carried out with varied refrigerants depending upon final effect and the mother liquor to be concentrated and treated. Tests have been successfully conducted in pilot plants with propane, ammonia, carbon dioxide, methylene chloride, methyl chloride diflurodichloromethane, trifluoromonochloromethane and their derivatives (Freons and Frigens). The adiabatic cooling with each of these refrigerants proceeds without any difficulty. It should be noted that the usual precautions should be taken with carbon dioxide as the refrigerant in order to avoid freezing problems in the injection valves. In the process of this invention, it is often advantageous if the refrigerant is soluble in the mother liquor being treated. Soluble refrigerants in the mother liquor exert a favorable influence on the lowering of the viscosity of the highly concentrated mother liquors. It has also been noted that the dissolved refrigerants in the mother liquor exert favorable influences upon the rate and type of crystal formation.

Soluble refrigerants have been noted to be especially useful in the concentration of fruit juices as they permit the highest degree of concentration of the solutes while avoiding pumping problems with the highly viscous concentrates containing high proportions of sugars.

The process of this invention may be carried out under various conditions of pressure within the contact vessels. It is advantageous for the process to be carried out at atmospheric pressure. However, pressures below ambient and super atmospheric pressure may also be utilized in the contact vessels $R_1$ and $R_2$. For example, it has been found that when the process is carried out under pressures above atmospheric, large amounts of liquid refrigerant remain in the resulting slurry. These amounts are reduced when the process of this invention is operated at lower pressures.

These differential amounts of fluid refrigerant remaining in the concentrate may be advantageously utilized, for example, in the case where water is to be removed from delicate pharmaceutical oil emulsions and the process is carried out with propane as a coolant. When vessel $R_1$ is at atmospheric pressure and, at a temperature of about $-3°$ C, approximately 6 to 10% of the propane remains in the emulsion. If however, the process is carried out, approximately 3 atmospheres, then up to 30% of the propane remains dissolved in the oils thereby keeping the resulting emulsion in a fluid form. Further, if the process is carried out utilizing Freon 12 as the refrigerant, the refrigerant content in the vessel at a pressure of 2 atmospheres is increased to over 60%. The resultant concentrate is a completely mobile liquid which permits ease of pumping of the slurry before filtration of the resultant concentrate.

Conversely, when the operation is conducted in lower than atmospheric pressures, the refrigerant may be kept in the cooling vessel $R_1$ or in an adjacent secondary tank. When operating under these conditions, special crystallization effects are obtained. For example in the dewaxing of edible oils, in which the presence of excess refrigerant can have an adverse effect upon the type of crystals and on crystal growth, it is possible to achieve satisfactory crystal growth by operating at lower than atmospheric pressures.

When it is desired to obtain particularly low temperatures, it is possible to achieve temperatures of $-90°$ C (using liquid air) without difficulty depending upon the refrigerant and the pressure within the contact column $R_1$.

DETAILED DESCRIPTION OF THE INVENTION

Figure 2:
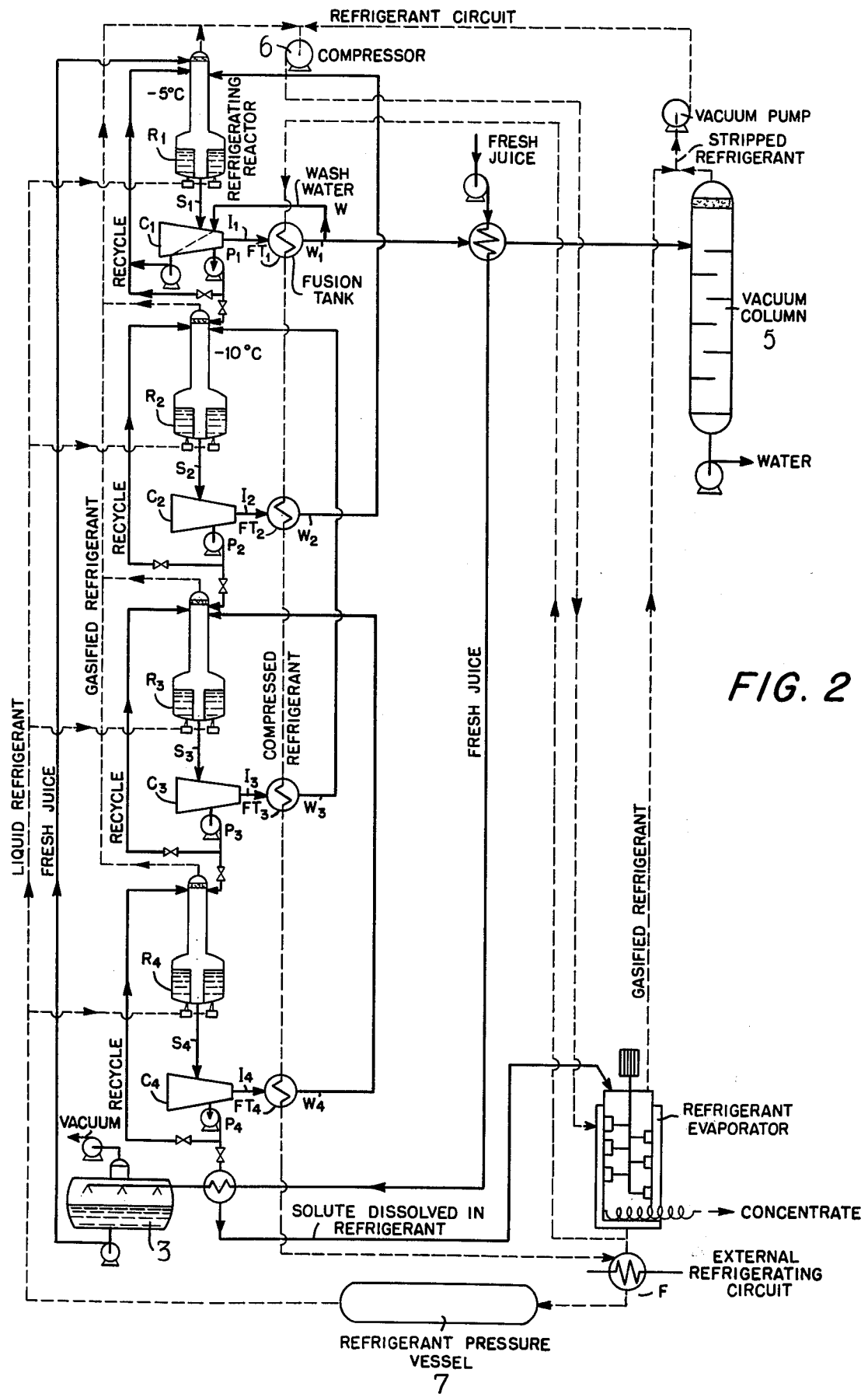

As a preferreed example, fresh orange juice was subjected to the continuous concentration treatment of this invention utilizing dichlorodifluoro methane (Freon or Frigen 12) as refrigerant is described and with reference to the flow chart of FIG. 1.

Fresh orange juice FJ at a temperature of 20° C, previously clarified by centrifuging to be free of solids such as pits, pulp particles etc. is pumped by means of pump 1 through heat exchangers $HE_1$ and $HE_2$ into storage tank 3, maintained under a protective atmosphere in order to preserve the vitamins and prevent oxidation. The temperature of the juice in tank 3 is about 7° C. From tank 3 the juice is pumped into the upper part of the first stage cooling vessel $R_1$ which is provided in its upper part with a droplet separator (not shown). The juice flows countercurrent to the rising refrigerant vapors down over the plates into the lower widened part of the cooling vessel $R_1$ which is equipped at its bottom with several refrigerant injection valves 2. Valves 2 serve to introduce the refrigerant directly into cooling vessel $R_1$. The refrigerant from pressurized storage vessel 7 is injected in the liquid phase into cooling vessel $R_1$ at a pressure of about 5 atmospheres. As a result of the adiabatic expansion of the refrigerant in cooling vessel $R_1$, the temperature of the juice at the bottom of said cooling vessel $R_1$ decreases to about $-5°$ C. As a result of the cooling to about $-5°$ C, the water component of the juice freezes to form a slurry of ice crystals in a mother liquor of juice concentrate. The turbulence caused by the phase change of the refrigerant provides for a homogenous slurry of the water crystals in the mother liquor. It also equalizes the temperature within the slurry and prevents lump formation.

The injection of the refrigerant through valve 2 is controlled and regulated to insure that the slurry of ice crystals in the mother liquor remains fluid. Portions of this slurry are continuously discharged into centrifuge $C_1$. Crystal formation is initiated at temperatures in the range $-1.5$ to $-2°$ C. The crystals grow under the influence of the uniform temperature within contact vessel $R_1$ which is maintained at $-5°$ C. The crystals, in the case of frozen fruit juices are pure ice.

Centrifuge $C_1$ where the crystals are separated from the mother liquor is equipped with a continuously operating ice washing system. The ice crystals are washed with water to prevent losses of any juice components resulting from any juice which adheres to the surface of the ice crystals.

At the initiation of the process according to the instant invention, all of the juice $P_1$ that has been centrifuged is recycled to vessel $R_1$ by closing valve $V_1$ and opening valve $V_{1R}$. When the temperature in vessel $R_1$ has stabilized at about $-5°$ C, the second stage concentration step is initiated by opening valve $v_1$ and partially closing valve $v_{1R}$. At about $-5°$ C approximately 50% of the water has been crystallized from the juice. It is eliminated as ice via centrifuge $C_1$.

When second stage concentration is initiated i.e. when the temperature of vessel $R_1$ has stabilized at $-5°$, valve 1 is opened so that between 20 to 50% of the preconcentrated juice i.e. the mother liquor is continuously passed from centrifuge $C_1$ into cooling vessel $R_2$. The proportions and conditions in first stage vessel $R_1$ are adjusted in such a manner that the temperature of $R_1$ remains substantially constant and the feed amounts thereto are similarly constant so that the amounts of fresh juice and recycled concentrated juice $P_{1R}$ that is already preconcentrated are continuously passed into vessel $R_1$ and a part of this first stage concentrate is passed into vessel $R_2$ through valve $V_1$.

The recycling of preconcentrated juice to vessel $R_1$ serves to maintain a low proportion of crystals to concentrated juice components in order to permit good ice crystal growth therein. The growth of large ice crystals provides proper and complete separation.

The concentrated juice $P_1$ which has been pumped into second stage vessel $R_2$ is further cooled by the injection of additional refrigerant through multiple valves $2_a$ into the lower section of vessel $R_2$ thus further cooling this mother liquor. A portion of the refrigerant dissolves in the slurry which includes the additional crystals which form in vessel $R_2$. This dissolved refrigerant reduces the viscosity of the concentrated slurry $S_2$ in vessel $R_2$. Even when the coolant is insoluble in the slurry, the homogeniety of the slurry is preserved as a result of the turbulence caused by the boiling refrigerant and in addition, the added liquid provided by the immiscible refrigerant contributes to the mobility of the concentrated slurry $S_2$.

As a result of the direct injection of the refrigerant, the temperature in vessel $R_2$ is reduced, additional ice forms to create slurry $S_2$. The slurry $S_2$ is lead continuously from vessel $R_2$ into centrifuge $C_2$. In this second stage, the entire amount of mother liquor $P_2$ leaving centrifuge $C_2$ is recycled to vessel $R_2$ where an equilibrium temperature of $-9°$ to $-11°$ is maintained. This temperature range is preferred as at $-8°$ C about 65 to 70% of the initial water content of the juice will be crystallized as ice. This ice proportion increases to 72% at $-9°$ C; to 78% at $-10°$ C; and to 85% at $-11°$ C.

The juice concentrate from centrifuge $C_2$ is recycled to vessel $R_2$ through valve $V_{2R}$ until an equilibrium temperature within vessel $R_2$ has been reached. This equilibrium temperature determines the concentration of the final concentrate.

When the temperature in the vessel $R_2$ has become stabilized, a part of the centrifuged mother liquor $P_2$ is pumped through fusion tank heat exchanger $FT_2$ and then directly to reduced pressure column 4, in which the temperature of the concentrate is $+6°$ C. At this temperature, there is a complete removal and stripping of any refrigerant which may be dissolved in this final concentrate which is the desired product. As a result of the high degree of sugar concentration of the components of the juice in vessel $R_2$ the water crystals $I_2$ separated by centrifuge $C_2$ and having the temperature of $-10°$ C are microcrystalline in form. This form of ice crystals is very difficult to separate from the liquid juice-components, portions of which adhere to the microcrystals. These separated crystals $I_2$ are melted in fusion tank $FT_2$ and after melting are fed directly to first vessel $R_1$. The low temperature of the microcrystals is used in heat exchangers such as $FT_2$ to partially condense the compressed refrigerant on its way to refrigerant pressure vessel 7. In addition, any juice components adsorbed on or contained within the microcrystals are recycled by reintroduction into first stage cooling vessel $R_1$.

In addition, the first stage mother liquor $P_1$ is continuously subjected to a reconcentration process after centrifuge $C_1$ in the following manner: The slurry of crystals — from $R_1$, at a temperature of $-4°$ to $-5°$, — is separated at $C_1$, to yield ice crystals in substantially pure form. 20 to 90% of the mother liquor $P_1$ is recycled to vessel $R_1$ through valve $V_{1R}$, and the rest is transferred to vessel $R_2$. At the same time, the fresh juice continuously enters from storage tank 3 into vessel $R_1$. Simultaneously, the crystals separated by centrifuge $C_1$ are washed with a part of the water $W_1$ obtained in fusion tank $FT_1$. This water $W_1$ which represents about ¼ of the melted ice stream W is utilized in the centrifuge $C_1$ for washing. After washing, all of the wash water is recycled to first stage vessel $R_1$. The remainder of the water, not used for washing, passes through heat exchanger $HE_1$ and then to column 5 where it is stripped from any entrained refrigerant gases. This water from column 5 is removed from the system and the refrigerant gas is recycled.

The a portion of second stage concentrate $P_2$ which is the liquid separated from the ice in centrifuge $C_2$ is transferred to column 4 where any dissolved refrigerant is stripped and the concentrate, the final product, is removed from the system.

All of the refrigerant introduced into the system into the cooling vessels $R_1$ and $R_2$ and vaporized through valves 2 and $2_A$ are pumped from the top of the vessels $R_1$ and $R_2$, through a droplet separator (not shown) and led to compressor 6. These gases are generally removed at about atmospheric pressure. However, when special effects are desired i.e. when some refrigerant liquid is to remain in the juice concentrate in order to lower its viscosity, it is advantageous to operate at higher pressures in different stages at vessel $R_1$ and $R_2$.

The refrigerant gases from cooling vessels $R_1$ and $R_2$ are fed to compressor 6 where they are compressed and then cooled and condensed to liquid state via heat exchangers which are fusion tanks $FT_1$ and $FT_2$, and if necessary, with the help of an external refrigeration circuit $HE_4$. The liquid condensed refrigerant is then led to and stored in tank 7 from where it is injected into vessels $R_1$ or $R_2$ as needed for refrigeration.

The above operation is substantially the same for all types of fruit juices. The specific temperature maintained in reactor $R_2$ depends upon the desired final concentration of the juice concentrate. Consequently any crystallizable product can be processed by this method. The products can be further processed by additional stages until total removal of the initial solvent, diluents and other undesirable crystallizable materials is achieved. To this end, a four-stage process is shown in FIG. 2. The only differences between FIG. 1 stages and the replacement of stripping column 4 by equipment which permits withdrawal of the final product as a solid by a screw expellor if such is its nature.

The feedstock liquids containing the crystallizable substance may be treated according to this invention with other diluents which may be soluble or insoluble in the product. Furthermore, various of the illustrated process and apparatus components may be interchanged by art-recognized equivalents. For instance, the centrifuges may be replaced by filters and/or filter presses. Similarly, screw expellers, Bird filters and other suitable equipment for the removal of the crystals from the mother liquor may be utilized. The actual configuration of the cooling vessels $R_1$ and $R_2$ wherein the ice is formed may vary with the size of the equipment being used, heat exchange conditions, nature of the refrigerant and the ambient surroundings which include the amount and degree of insulation necessary.

Because of the utilization of the refrigerant as a secondary solvent, the present invention makes it possible for the process to be carried out without any difficulty to a degree whereby a total removal of all the water or other crystallizable solvent without any after-treatment at elevated temperatures. By the continuous recycling technique at the first stage, crystals of large size, are formed and continuously removed. In addition, by careful control and design expedients, permitted by the process, it is possible to achieve great economy of energy exchange through the judicious use of heat exchangers between the cooled materials and the warmer materials.

Many varied coolants may be used depending upon the nature of the product to be concentrated. For an example, good results have been obtained with the following products and by the listed refrigerants used therewith.

TABLE

| FEEDSTOCK | REFRIGERANT |
|---|---|
| Fruit Juices | Propane |
|  | Freon 12 |
|  | Freon 22 |
|  | Carbon Dioxide |
| Beer | Carbon Dioxide |
| Wine | Freon 13 |
|  | Carbon Dioxide |
| Edible Oils | Methylene Chloride |
|  | Methyl Chloride |
|  | Carbon Dioxide |
|  | Propane |
| Xylene | Liquid Ammonia |

TABLE -continued

| FEEDSTOCK | REFRIGERANT |
|---|---|
| Milk | Freon 13 |
| Pharmaceutical Emulsions | Propane |
| Antibiotic Fermentation Beers | Propane |
|  | Carbon Dioxide |
| Botanical Extracts | Propane |
|  | Carbon Dioxide |
|  | Freon 22 |

The temperatures within the cooling vessels $R_1$ and $R_2$ may be adjusted according to the desired effects. It is possible to utilize the standard cooling towers without any difficulty provided that insulation is adequate, at temperatures ranging from $-90°$ C to up to $+20°$ C. Further, the rate of cooling can be accurately controlled by the amount of refrigerant introduced into vessels $R_1$ and $R_2$. The present invention, in addition, provides precise control of the crystal size of the materials which are crystallized during the first stage. By control of the cooling, the crystal size can be controlled to provide large crystals and consequently purer crystals. In addition, to achieving control by a slower refrigerant injection, changes in the diameter of cooling vessel $R_1$ and $R_2$ and varying the rate of feed of the liquids and the amount of recycling of mother liquor can also control the growth of the crystals.

An interesting aspect of the present process is the control of differing crystal sizes depending upon the concentration of the juices to be treated. Thus in the first stage centrifuge, $C_1$, the centrifuge screens may be relatively coarse i.e. 60 to 100 mesh per inch (0.4 to 0.25 mm opening) sizes are sufficient. However, in the second stage, centrifuge $C_2$, it is preferred to have smaller screen openings. If it is desired to insure that the final juice concentration have between 80 and 85% of the water removed, the screen opening diameter should not be over 0.1 mm. The substantial amounts of the fresh juice which adhere to such microcrystals are recovered because they are recycled to vessel $R_1$ after leaving heat exchanger fusion tank $FT_2$ forming stream $W_2$.

While the above description has been confined to describing the operation for concentrating fruit juices to the degree where approximately 80% of the water has been removed, the process is similarly useful in concentrating beers to remove excess water prior to shipment, for the concentration of crystallizable from non-crystallizable components of fats, for the separation of the xylene isomers, for the freeze concentration of milk, concentration of botanical extracts, teas, and the treatment of various labile antibiotic fermentation beers in order to concentrate the antibiotic contents thereof.

The process described for the juices are merely exemplary and the above art recognized equivalents can be substituted for the juices in the operations of the process described above. Furthermore, any apparatus units can be substituted by their art-recognized functional equivalents. All such art-recognized equivalents are intended within the scope of this invention.

I claim:

1. A process for concentrating a solution and for separating crystallizable components from a solution thereof which comprises introducing said solution into a first crystallization zone, spraying a highly volatile, pressurized and liquified cooling agent directly into said first crystallization zone into contact with said solution, wherein said cooling agent expands and cools said solution to a temperature sufficient to form a slurry of crystals of a first crystallizable component therein, maintaining said temperature constant, separating said crystals of first crystallizable component from said slurry to form a preliminary concentrated solution, transferring substantially only said preliminary concentrated solution to at least one further crystallization zone separate from said first crystallization zone spraying said cooling agent directly into said further crystallization zone into contact with said preliminary concentrated solution in an amount sufficient (a) to cool said preliminary solution in said further crystallization zone sufficiently below the temperature of said solution in said first crystallization zone to form a further slurry of crystals therein and at the same time (b) to act as a liquefacient for said further slurry and thus reduce the viscosity thereof, the temperature of said preliminary concentrated solution in said further crystallization zone being such that the total of the crystals formed in said first and said further crystallization zones is about 65 to 100% of the crystallizable components of said solution, separating said crystals from said further slurry to form a concentrated solution containing liquified coolant and separating said cooling agent from said concentrated solution.

2. The process according to claim 1, in which said cooling agent is soluble in said solution.

3. With process according to claim 1, wherein said solution is selected from the group of liquids containing dissolved crystallizable substances consisting of fruit juices, ferments, extracts, beers, milk and brackish water to yield concentrates of comestible or imbibable materials.

4. The process according to claim 1, wherein said cooling agent is selected from the group of refrigerants consisting of low-boiling high-vapor pressure, saturated and unsaturated aliphatic hydrocarbons having four or less carbon atoms and halogenated derivatives thereof, carbon dioxide liquified air, ammonia and mixtures thereof which are nondegrading with respect to said feedstock mixtures.

5. The process according to claim 1 wherein said process is utilized for selectively separating crystals of different melting point components, in such a way that the components are kept in separate circuits including individual successive crystallizing zones and thus are completely crystallized as a result of the continuous recycling, thereby obtaining products of high purity.

6. A process according to claim 1 in which only part of said preliminary concentrate is transferred to said further crystallization zone, the remaining preliminary concentrate being recycled to the first crystallization zone.

7. A process according to claim 1 in which said cooling agent is sprayed into and expanded in said first and further crystallization zones countercurrent to the flow of said solutions and at such a rate as to create turbulence within said solution and to produce a substantially homogeneous and fluid slurry of crystals and to prevent lump formation and sedimentation.

8. A process according to claim 1 in which said crystals separated from said further slurry are recycled to said first crystallization zone and said separated crystals of first crystallizable component are washed and recovered as substantially pure products.

9. A process according to claim 1, in which said solution is a fruit juice to be concentrated in which the liquid part of the major portion of said further slurry of crystals is recycled into said first crystallization zone and said crystals separation from said further slurry are also recycled to said first crystallization zone and in which the concentration solution obtained after the separation of said crystals from said further slurry and the separation of said cooling agent is removed as finished product.

* * * * *